United States Patent [19]

Hsu et al.

[11] Patent Number: 5,721,485
[45] Date of Patent: Feb. 24, 1998

[54] HIGH PERFORMANCE ON-CHIP VOLTAGE REGULATOR DESIGNS

[75] Inventors: Louis Lu-Chen Hsu, Fishkill; Toshiaki Kirihata, Wappingers Falls; Somnuk Ratanaphanyarat, Poughkeepsie, all of N.Y.; Hyun Jong Shin, Ridgefield, Conn.

[73] Assignee: IBM Corporation, Armonk, N.Y.

[21] Appl. No.: 582,815

[22] Filed: Jan. 4, 1996

[51] Int. Cl.⁶ .................................................. H03K 3/01
[52] U.S. Cl. .................................. 323/901; 327/540
[58] Field of Search ............................. 323/282, 285, 323/901; 327/535, 536, 540, 541

[56] References Cited

U.S. PATENT DOCUMENTS

| | | |
|---|---|---|
| 553,030 | 9/1896 | Tedrow et al. ...................... 365/226 |
| 3,824,450 | 7/1974 | Johnson et al. . |
| 3,941,989 | 3/1976 | McLaughlin et al. . |
| 4,317,181 | 2/1982 | Teza et al. . |
| 4,365,290 | 12/1982 | Nelms et al. . |
| 4,538,231 | 8/1985 | Abe et al. . |
| 4,943,761 | 7/1990 | Fox et al. . |
| 5,097,303 | 3/1992 | Taguchi . |
| 5,105,144 | 4/1992 | Trump . |
| 5,162,668 | 11/1992 | Chen et al. ............................ 327/541 |
| 5,355,077 | 10/1994 | Kates . |
| 5,359,552 | 10/1994 | Dhong et al. ...................... 365/189.09 |

*Primary Examiner*—Matthew V. Nguyen
*Attorney, Agent, or Firm*—Murphy and Presser

[57] ABSTRACT

High performance on-chip voltage regulator designs are disclosed which have settling times which are fast enough to meet today's microprocessor/microcontroller requirements when they are entering an active mode from a passive mode. A first preferred embodiment provides a circuit in which a single pulse control signal is required to instantly raise Vy when the microprocessor is in the wake-up period. The circuit includes a charge pump, a differential amplifier, and a microprocessor connected to the power supply through a voltage regulating device. A second embodiment provides a circuit to stimulate Vint prior to CPU wake-up. The principle of operation of this embodiment is to stimulate the voltage regulating device prior to CPU wake-up. By stimulating (pulling down) the Vint node, the voltage regulating device will raise Vy and ready the microprocessor to draw a large current.

12 Claims, 5 Drawing Sheets

HIGH PERFORMANCE ON-CHIP VOLTAGE REGULATOR DESIGNS

BACKGROUND OF THE INVENTION

1. Field of the Invention

The present invention relates generally to high performance on-chip voltage regulator designs, and more particularly pertains to high performance on-chip voltage regulator designs which have settling times which are fast enough to meet today's microprocessor/microcontroller requirements when they are entering an active mode from a passive mode.

2. Discussion of the Prior Art

On-chip voltage regulators (or voltage downconverters) have become quite popular in today's VLSI chips, e.g., in memory and microprocessor/microcontroller areas. A chip with a voltage regulator can be operated with a single external power supply. Moreover, more than one level of internal power supply voltage can be generated for different applications in different operating modes. Using a lower power supply voltage reduces power consumption by the circuit. Moreover, a voltage regulator regulates the supply voltage such that it becomes relatively insensitive to external power variations.

Voltage regulators designed for DRAM applications may also be used for microprocessors/microcontrollers. However, since memory chips generally draw much less current (in the range of hundreds of mA) than microprocessor/microcontroller chips (few A), the size of a voltage regulator used for a DRAM is expected to be smaller than that for a microprocessor/microcontroller.

FIG. 1 illustrates a prior art on-chip voltage regulator used for memory chips, as proposed by Taguchi U.S. Pat. No. 5,097,303. As noted, Vint (the internal voltage supply) is not regulated, and may be subject to voltage variations when a large current is drawn by the load. To smooth out the voltage variations, a large capacitor C is required. This kind of voltage regulator is only good for memory applications, for example, DRAM circuits that consume current in the range of 100 mA. The Taguchi patent also discloses using a "clock bar" pulsed signal to raise the internal voltage during the start-up period. Unfortunately, this method is still not able to avoid an initial voltage dip in the power supply when a large initial current is drawn.

FIG. 2 illustrates a prior art voltage regulator using a differential amplifier with feedback control, as proposed by Chen U.S. Pat. No. 5,162,668, to overcome the problem with voltage regulation. This voltage regulator is more suitable for microprocessor/microcontroller applications because its internal voltage supply is regulated by a differential amplifier, and also because a boosted voltage or charge pump is implemented therein.

One significant disadvantage of these prior art circuit designs is that their settling times are not fast enough to meet today's microprocessor/microcontroller requirements. When entering an active mode, a microprocessor/microcontroller will instantly draw a large amount of current. It typically takes more than 3 clock cycles for the voltage regulator to settle the internal voltage, as illustrated by the graph of FIG. 3. As illustrated, the internal voltage during this period may drop to an unacceptable level (below 10% of Vdd), and may result in an internal data loss.

Prior art voltage regulator circuits can be designed to provide adequate voltage regulation, however such circuit designs require relatively large voltage regulating devices which consume a relatively large amount of power.

SUMMARY OF THE INVENTION

Accordingly, it is a primary object of the present invention to provide high performance on-chip voltage regulator designs.

A further object of the subject invention is the provision of voltage regulators for power supplies for circuits such as microprocessors and microcontrollers which are generally large circuits with transistor counts in the range of $10^6$ to $10^8$.

In accordance with the teachings herein, the present invention provides an on-chip voltage regulator circuit for a circuit having a supply voltage Vint, and a voltage charge pump for producing a boosted voltage supply. A differential amplifier has a first input coupled to Vint and a second input coupled to a reference voltage Vref, and produces an output voltage Vy. A voltage regulation device is responsive to the output voltage Vy of the differential amplifier to regulate the supply voltage Vint.

The on-chip voltage regulator circuit has applicability to circuits which require relatively fast setting times, such as microprocessors and microcontrollers.

In a first embodiment, a current source device such as a p-fet device couples the output of the charge pump to the output of the differential amplifier at Vy, to provide a boosted pulse supplied by the current source device to the output of the differential amplifier and the input of the voltage regulating device, thereby allowing the voltage regulator to respond to an initial voltage change upon start-up of the circuit. A pulse control signal is generated by the circuit at a pin, upon start-up of the circuit, and is an input to a gate of the current source device to initiate operation of the voltage regulator. In greater detail, the pulse control signal is directed as an input to a level shifter circuit, the output of which is directed as an input to an inverter circuit, the output of which is coupled to the gate of the p-fet current source device. The voltage regulating device preferably comprises an n channel device.

In a second embodiment, a voltage pull down device is coupled to Vint to pull down and stimulate the voltage regulating device to raise Vy and prepare the circuit to draw a large current upon start-up. The voltage pull down device can comprise an n channel device.

BRIEF DESCRIPTION OF THE DRAWINGS

The foregoing objects and advantages of the present invention for high performance on-chip voltage regulator designs may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The present invention provides several alternative embodiments to overcome the problem with slow settling times in power supplies for circuits such as microprocessors and microcontrollers. The present invention is generally applicable to voltage regulators for large circuits with transistor counts in the range of $10^6$ to $10^8$, such as for a microprocessor or a microcontroller. The several embodiments disclosed herein are for on-chip voltage regulators for a chip that has a predetermined large initial current draw.

Figure 1:
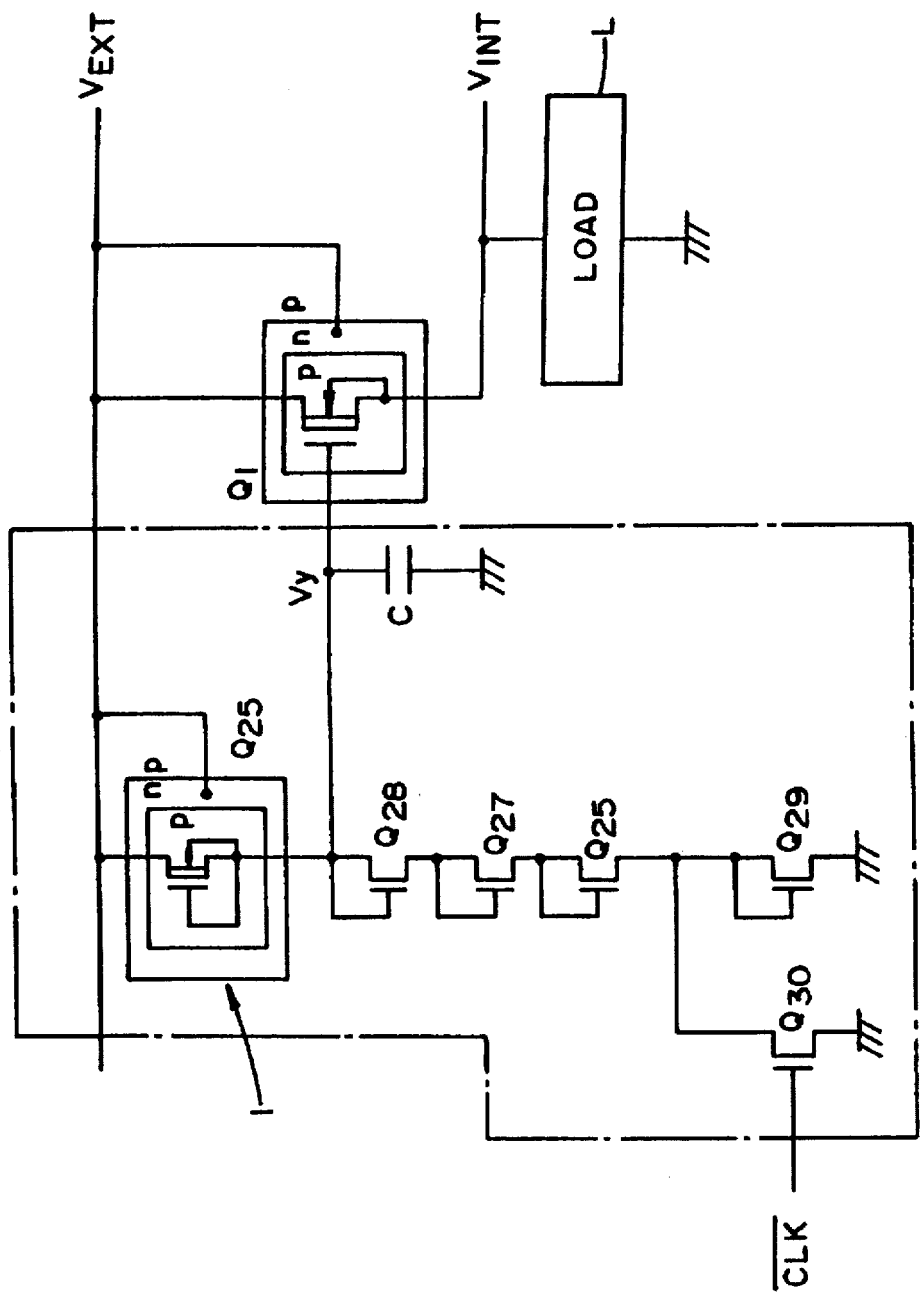
FIG. 1 illustrates a prior art on-chip voltage regulator used for memory chips, as proposed by Taguchi U.S. Pat. No. 5,097,303, wherein Vint (the internal voltage supply) is not regulated, and may be subject to substantial voltage variations when a large current is drawn by the load.
Figure 2:
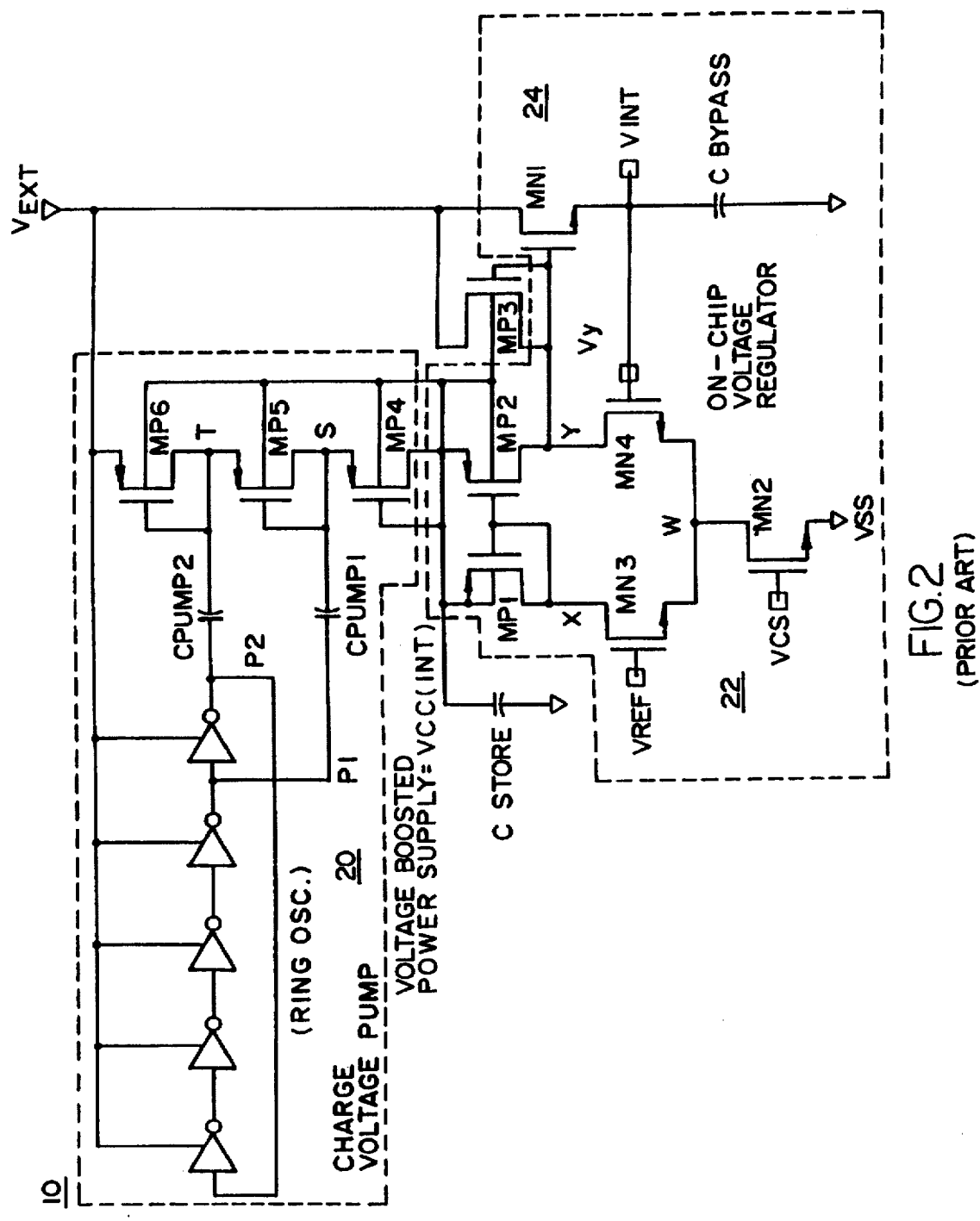
FIG. 2 illustrates a prior art voltage regulator using a differential amplifier with feedback control, as proposed by Chen U.S. Pat. No. 5,162,668, to overcome the problem with voltage regulation, which is more suitable to microprocessor/microcontroller applications.
Figure 3:
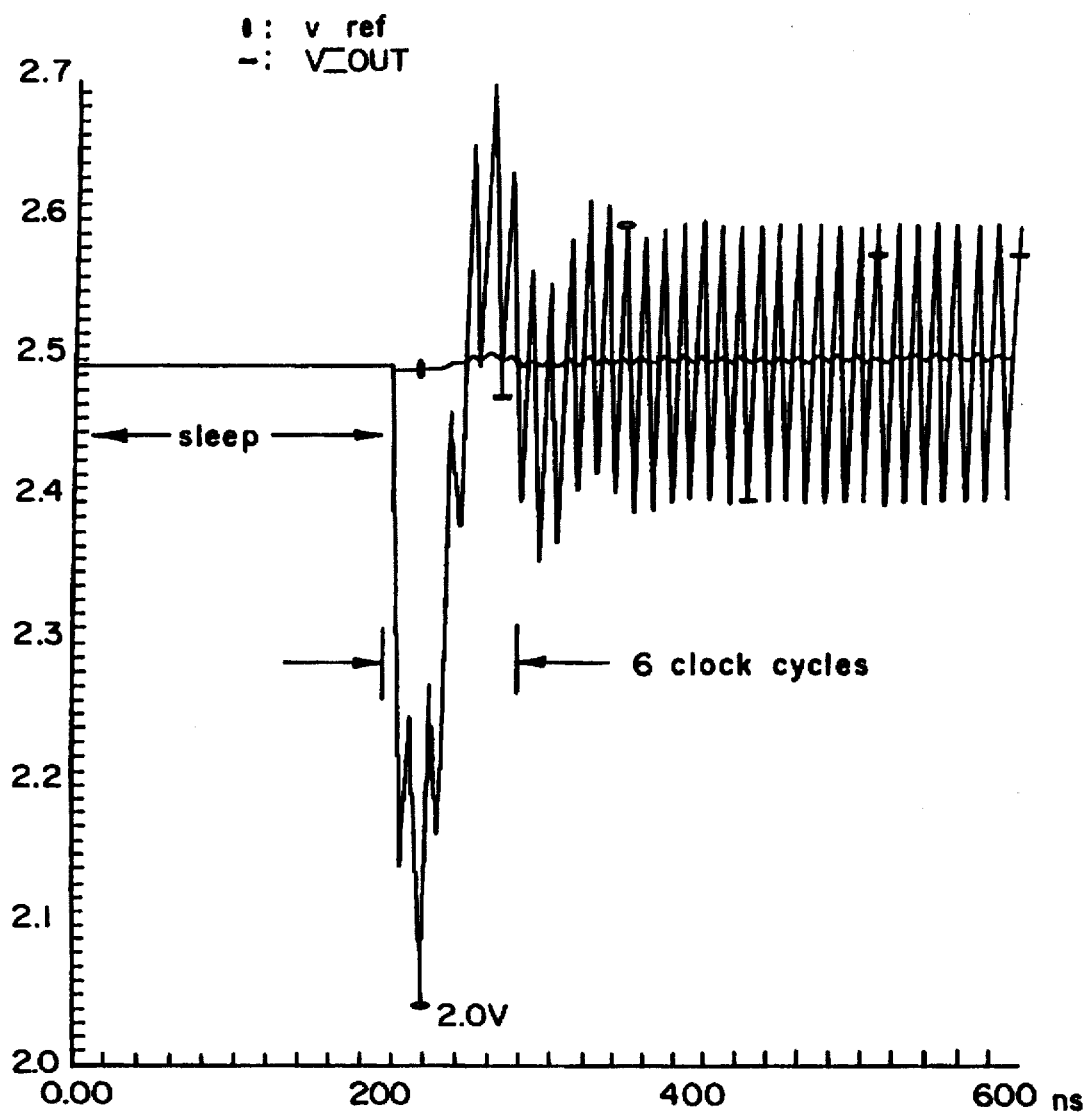
FIG. 3 is a graph which illustrates that as a microprocessor/microcontroller enters an active mode from a passive mode, the microprocessor/microcontroller instantly draws a large amount of current, and it typically takes a voltage regulator 4 to 8 clock cycles to settle the internal voltage.
Figure 4:
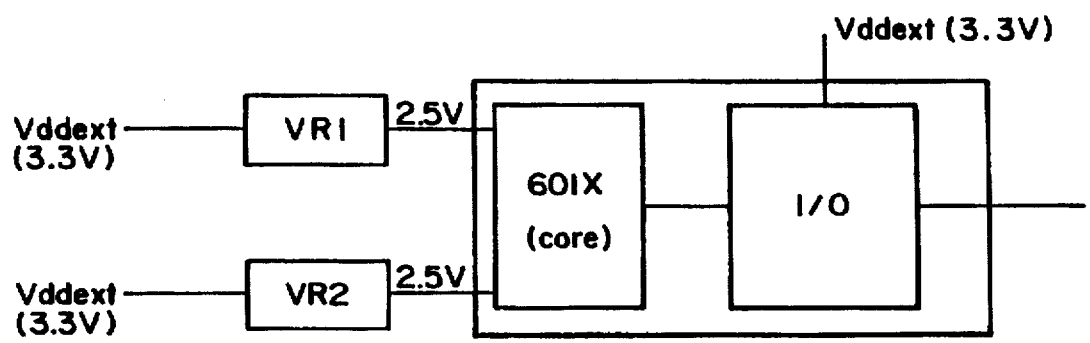
FIG. 4 illustrates a schematic of a chip which has an on-chip voltage regulator, and is disclosed as an example of a microprocessor/microcontroller chip which can use the technical approaches of the present invention.

FIG. 4 illustrates a schematic of a microprocessor/microcontroller chip which has an on-chip voltage regulator, and is disclosed as an example of a circuit which can use the technical approaches of the present invention. This chip is facilitated with a 3.3 V external power supply, as illustrated in FIG. 4. Through two on-chip voltage regulators VR1 and VR2, the voltage is reduced and regulated at 2.5 V for the core of chip operation. Through the I/O unit, the voltage is converted back to 3.3 V to be interfaced with outside circuitry. Each on-chip voltage regulator VR1 and VR2 is designed to handle current of about 1 A at full operating strength. Each voltage regulator is of the type as shown in FIG. 2, and basically consists of a charge or voltage pump 20, a differential amplifier 22, and a large voltage regulating device 24. Details of the design of these circuits are disclosed in further detail in the Chen patent mentioned earlier.

The reason for the slow settling time of the exemplary microprocessor/microcontroller chip of FIG. 4 can be explained as follows. When the microprocessor is "waking up", entering an active mode from a stand-by mode, it instantly draws about 10 to 100 times more current than in the stand-by mode. To accommodate that, Vy of the voltage regulating device 24, FIG. 2, has to increase accordingly. Although Vint is regulated by the differential amplifier 22, since Vy cannot react quickly enough, Vint is forced to drop in order to maintain the increased value of Vy. In other words, the voltage regulator, depending upon its design, will take a few cycles to respond to this change. To solve this problem, or to keep Vint stable during this period, the following embodiments of the present invention are proposed.

Figure 5:
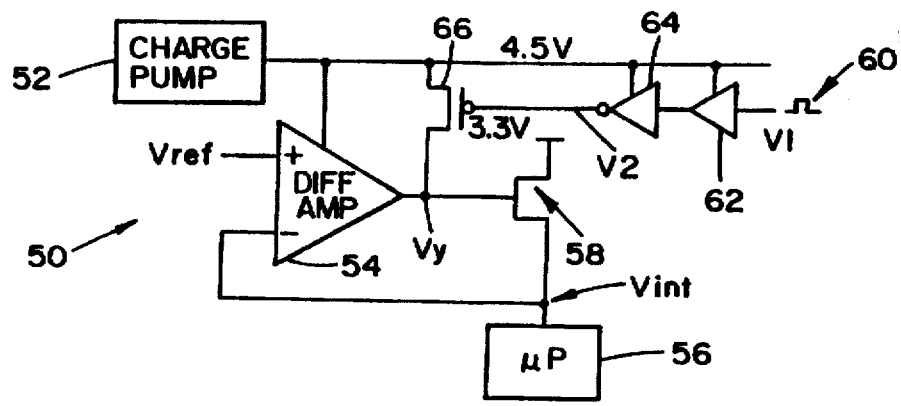
FIG. 5 illustrates a circuit schematic for a first preferred embodiment of the present invention in which a single pulse control signal is utilized to instantly raise Vy when the microprocessor is in a wake-up mode.

A first preferred embodiment of the present invention provides a circuit to directly raise Vy. FIG. 5 illustrates a circuit schematic for this approach in which a single pulse control signal is required to instantly raise Vy when the microprocessor is in the wake-up period.

The circuit 50 of FIG. 5 includes a charge pump 52, a differential amplifier 54, and a microprocessor 56 connected to the power supply through a voltage regulating device 58 comprising an N channel voltage regulating device. In alternative embodiments, the N channel voltage regulating device 58 can be replaced by a P channel voltage regulating device, depending upon the design of the differential amplifier 44.

In the circuit of FIG. 5, a control signal at 60 initiates operation of the circuit. For example, in the exemplary chip of FIG. 4, a hard reset pin can be used to generate such a control signal. A level shifter 62 is used to shift the signal voltage from approximately 2.5 V to approximately 4.5 V, and an inverter 64 to invert the signal to turn on a p-fet device 66 functioning as a current source. Here, Vdd of the level shifter 62, inverter 64, and the p-fet device 66 (W=10 μm) are all connected to the output of the charge pump 52, at about 4.5 V. During operation of this circuit, the voltage at the output of the differential amplifier 54 is directly controlled by the boosted pulse provided by the device 66, allowing the existing voltage regulating device 58 to effectively respond to an initial voltage change.

Figure 6:
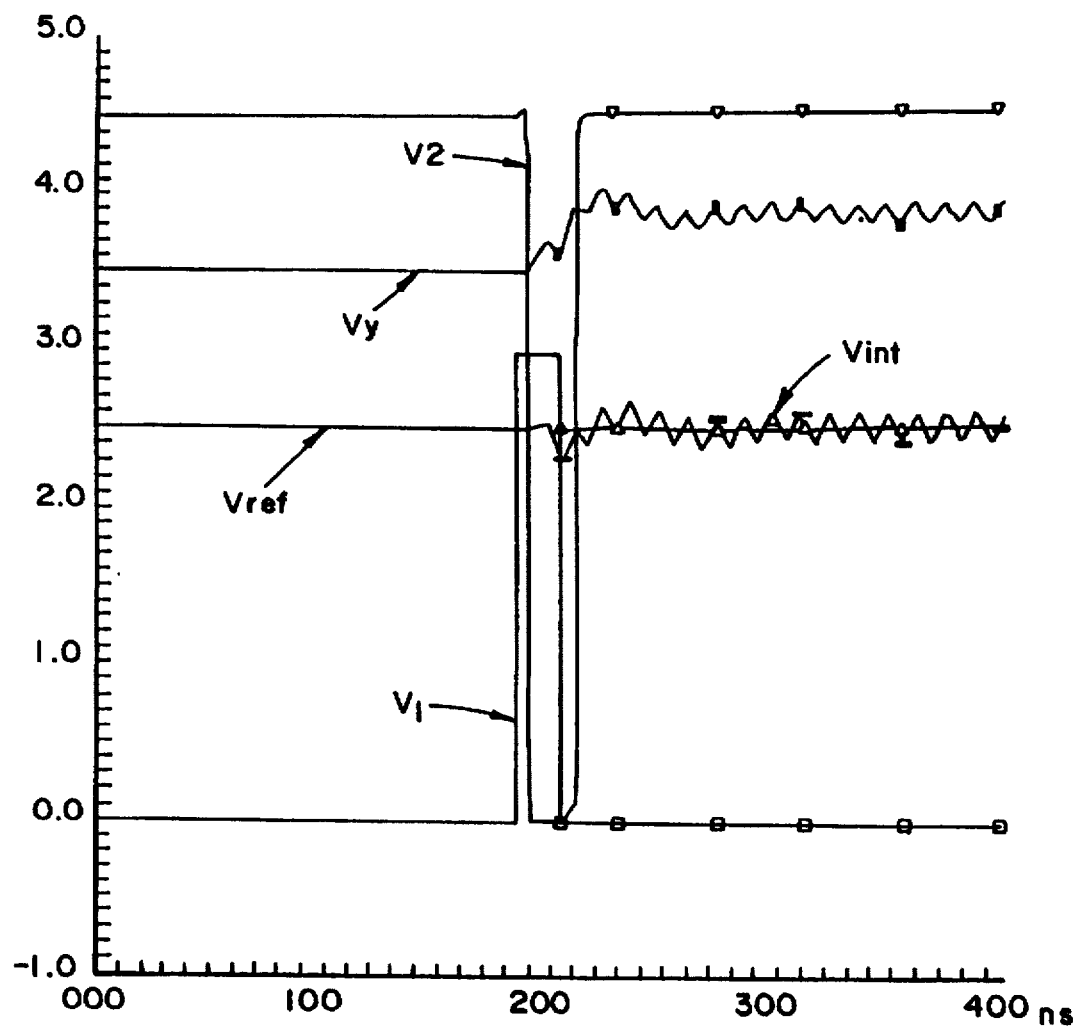
FIG. 6 illustrates a simulated waveform for the embodiment of FIG. 5, and shows that even at the first cycle, Vint is right in the operating voltage range.

The advantages of this approach can be summarized as: 1) the added overhead is very small, 2) an existing reset pin in the microprocessor/microcontroller can be used for the control signal, so all pins already exist. FIG. 6 illustrates the simulated waveform, and even at the first cycle, Vint is right in the operating voltage range.

A second embodiment of the present invention provides a circuit to stimulate Vint prior to CPU wake-up. The principle of operation of this embodiment is to stimulate the voltage regulator prior to CPU wake-up. By stimulating (pulling down) the Vint node, the voltage regulator will raise Vy by itself and ready the microprocessor to draw a large current.

Figure 7:
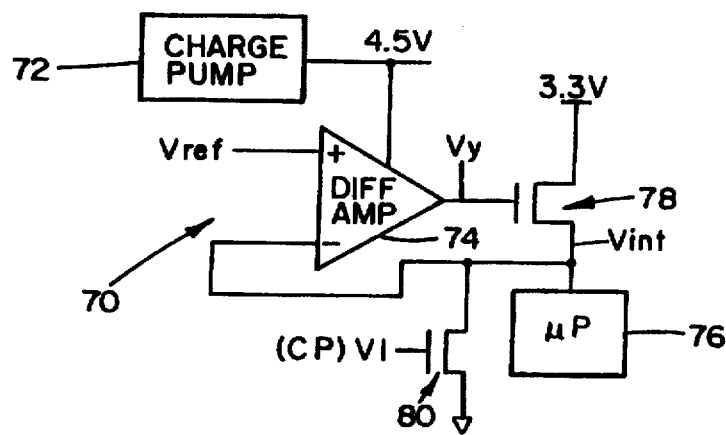
FIG. 7 and 8 illustrate respectively a circuit schematic and the resulting simulated waveform for a second embodiment of the present invention which provides a circuit to stimulate Vint prior to CPU wake-up, such that by stimulating (pulling down) the Vint node, the voltage regulator will raise Vy and ready the microprocessor to draw a large current.
Figure 8:
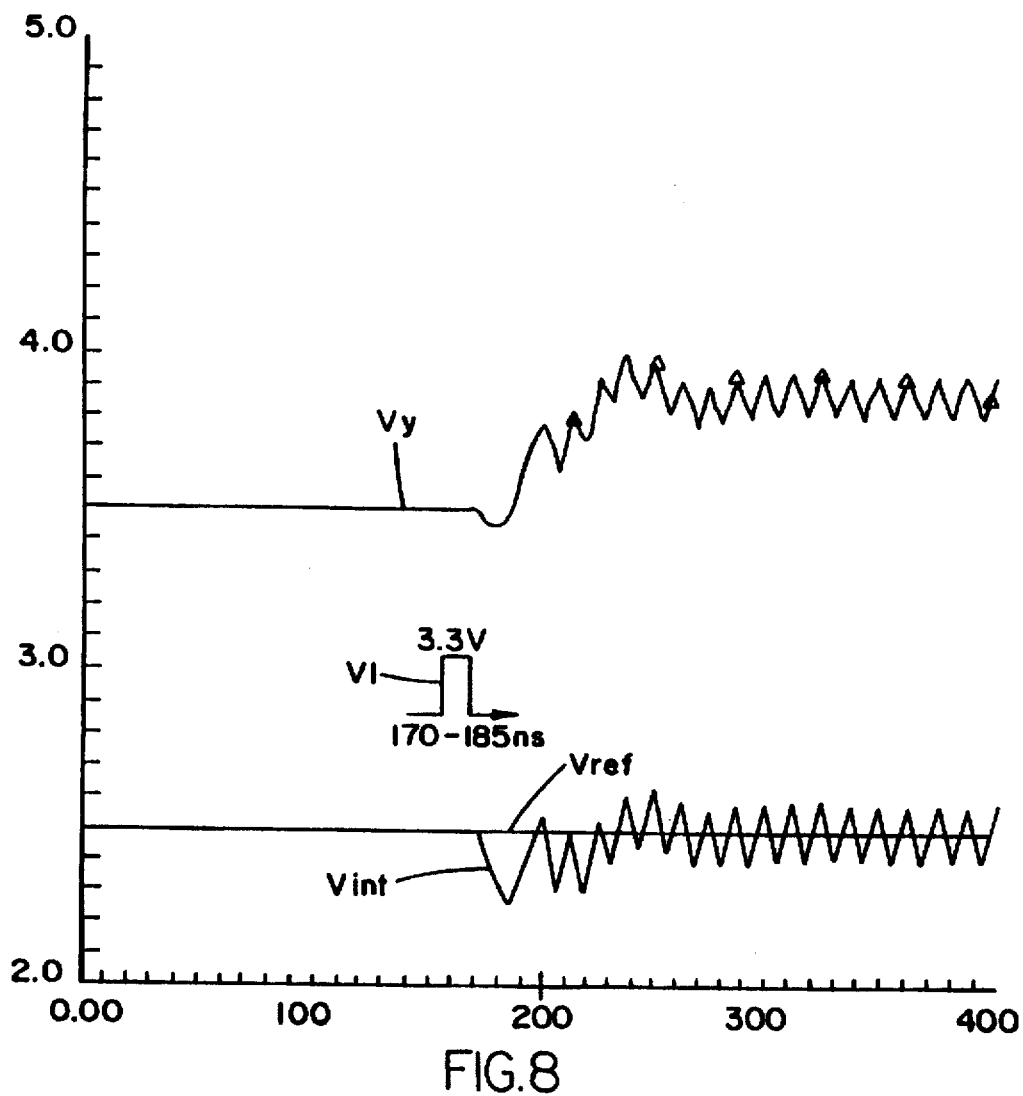

FIGS. 7 and 8 illustrate respectively the circuit schematic and the resulting simulated waveform for this technical approach. The circuit 70 of FIG. 7 includes a charge pump 72, a differential amplifier 74, and a microprocessor 76 connected to the power supply at Vy through a voltage regulating device 78 comprising an N channel voltage regulating device. In alternative embodiments, the N channel voltage regulating device 78 can be replaced by a P channel voltage regulating device, depending upon the design of the differential amplifier 74. The embodiment of FIG. 7 utilizes an N channel voltage pull down device 80 to pull down and stimulate the voltage regulating device 78, such that the voltage regulating device 78 raises Vy and readies the microprocessor/microcontroller 76 to draw a large current. In operation, before the microprocessor wakes up, a pulse V1 is transmitted to the voltage pull down device 80. This results in the pull voltage pull down device 80 drawing current from the internal node, and also results in a voltage drop for Vint. This causes the differential-amplifier 74 to increase Vy to provide more current to raise Vint, so that when the microprocessor is activated, there will not be an initial drop in the supply voltage Vint.

Drawbacks of this approach are a large pulldown device 80 (here W=3 mM) is required. However, this drawback can be minimized in some embodiments by using a higher voltage directly from the charge pump as an input to the voltage pull down device, thus reducing the device size. In these embodiments, V1 in FIG. 7 is the output of the charge pump 72 4.5 V in FIG. 7). Moreover, the pulse width and timing of the control signal to device gate 80 may be required to be optimized to effectively stimulate the voltage regulator. Nevertheless, the concept of pulling down the regulator output by using a pulsed clock before the CPU consumes a substantial amount of current has never before been proposed in the prior art.

In summary, the first embodiment is a preferred embodiment since it has no or very minimum area penalty, and a control pin for the control signal for the first embodiment already exists in many microprocessors. The first embodiment is also good for DRAM applications.

While several embodiments and variations of the present invention for high performance on-chip voltage regulator designs are described in detail herein, it should be apparent that the disclosure and teachings of the present invention will suggest many alternative designs to those skilled in the art.

Having thus described our invention, what we claim as new and desire to secure by Letters Patent is:

1. An on-chip voltage regulator circuit for a circuit having a supply voltage (Vint), comprising:
   a. a voltage charge pump for producing a boosted voltage supply;
   b. a differential amplifier, having a first input coupled to the supply voltage (Vint) and a second input coupled to a reference voltage (Vref), and producing an output voltage (Vy) at an output;
   c. a voltage regulating device responsive to the output voltage (Vy) of the differential amplifier to regulate the supply voltage (Vint);
   d. means for providing a boosted pulse supplied by a current source device to the output of the differential amplifier and the input of the voltage regulating device to allow the voltage regulator circuit to respond to an initial voltage change upon start-up of the circuit, wherein the current source device couples the output of the charge pump to the output of the differential amplifier.

2. An on-chip voltage regulator circuit as claimed in claim 1, wherein a pulse control signal generated by the circuit at a pin, upon start-up of the circuit, is an input to a gate of the current source device to initiate operation of the voltage regulator.

3. An on-chip voltage regulator circuit as claimed in claim 2, wherein the pulse control signal is directed as an input to a level shifter circuit, the output of the level shifter circuit is directed as an input to an inverter circuit, the output of the inverter circuit is coupled to the gate of the current source device.

4. An on-chip voltage regulator circuit as claimed in claim 1, wherein the current source device comprises a p-fet device.

5. An on-chip voltage regulator circuit as claimed in claim 1, wherein the voltage regulating device comprises an n channel device.

6. An on-chip voltage regulator circuit as claimed in claim 1, wherein the circuit comprises a microprocessor.

7. An on-chip voltage regulator circuit as claimed in claim 1, wherein the circuit comprises a microcontroller.

8. An on-chip voltage regulator circuit for a circuit having a supply voltage (Vint), comprising:
   a. a voltage charge pump for producing a boosted voltage supply;
   b. a differential amplifier, having a first input coupled to the supply voltage (Vint) and a second input coupled to a reference voltage (Vref), and producing an output voltage (Vy) at an output;
   c. a voltage regulating device responsive to the output voltage (Vy) of the differential amplifier to regulate the supply voltage (Vint);
   d. means for pulling down and stimulating the voltage regulating device to raise the output voltage (Vy) of the differential amplifier and prepare the circuit to draw a large current upon start-up, and including a voltage pull down device coupled to the output of the voltage regulating device at the supply voltage (Vint).

9. An on-chip voltage regulator circuit as claimed in claim 8, wherein the voltage pull down device comprises an n channel device.

10. An on-chip voltage regulator circuit as claimed in claim 8, wherein the voltage pull down device is coupled to the output boosted voltage supply of the voltage charge pump.

11. An on-chip voltage regulator circuit as claimed in claim 8, wherein the circuit comprises a microprocessor.

12. An on-chip voltage regulator circuit as claimed in claim 8, wherein the circuit comprises a microcontroller.

* * * * *

UNITED STATES PATENT AND TRADEMARK OFFICE
CERTIFICATE OF CORRECTION

PATENT NO.  : 5,721,485
DATED       : February 24, 1998
INVENTOR(S) : Louis L. Hsu, et al.

It is certified that error appears in the above-identified patent and that said Letters Patent is hereby corrected as shown below:

On the Title Page, Section [73]: "IBM Corporation" should read

--International Business Machines Corporation--

On the Title Page, Section [56], line 1: "553,030   9/1896" should read

--5,553,030   9/1996--

On the Title Page, Column 2, line 8: "Murphy and Presser" should read

--Scully, Scott, Murphy & Presser--

Signed and Sealed this

Twenty-sixth Day of October, 1999

Attest:

Q. TODD DICKINSON

Attesting Officer

Acting Commissioner of Patents and Trademarks